Figure 1:
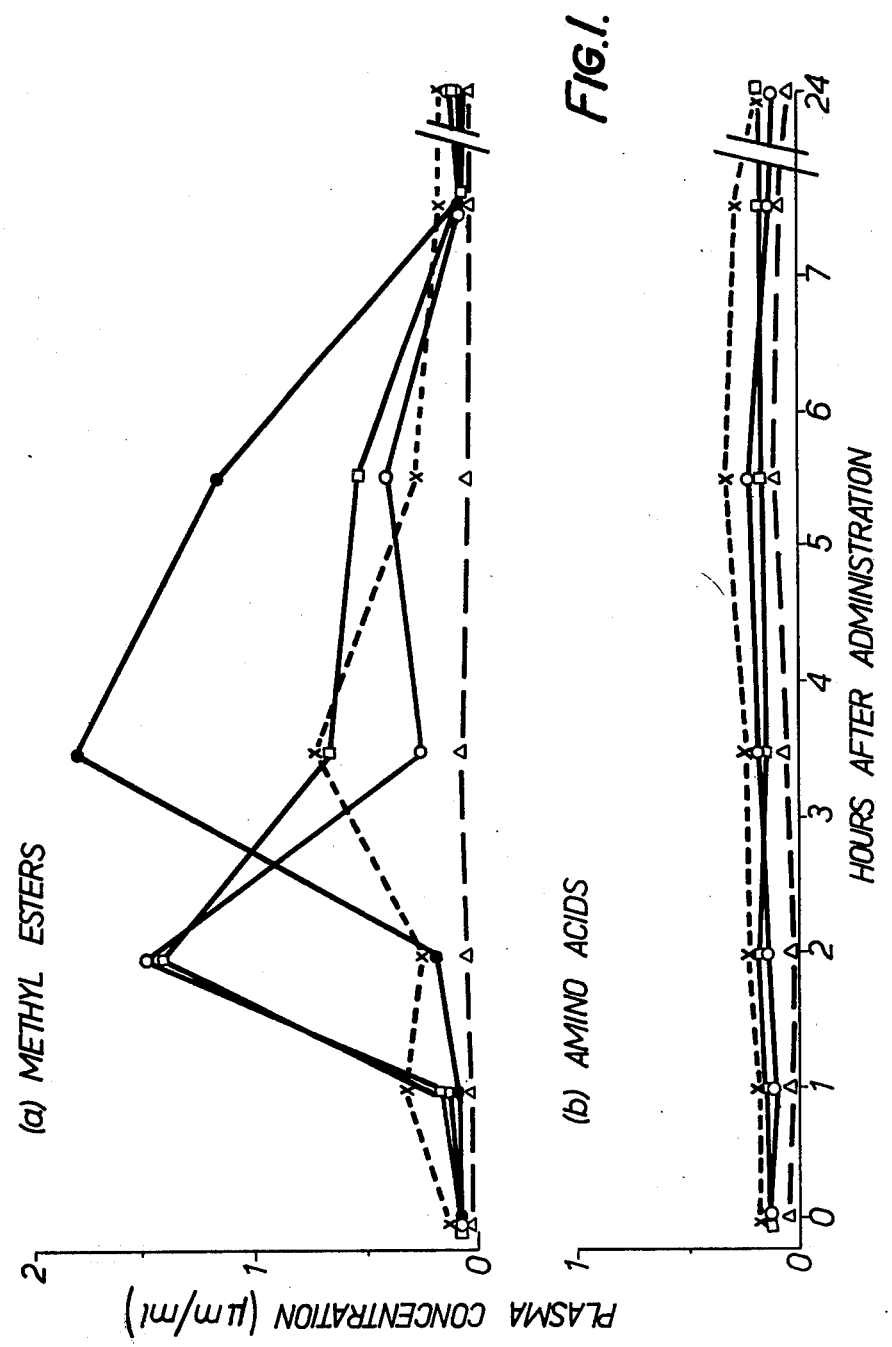

United States Patent [19]

Ferguson et al.

[11] 4,000,318
[45] Dec. 28, 1976

[54] AMINO ACID SUPPLEMENTS

[75] Inventors: Kenneth Adie Ferguson, Canberra;
Neil Taylor Hinks, Sydney, both of
Australia

[73] Assignee: **Commonwealth Scientific and
Industrial Research Organization,**
Campbell, Australia

[22] Filed: Aug. 12, 1975

[21] Appl. No.: 604,052

[30] Foreign Application Priority Data

Aug. 19, 1974 Australia ............................ 8562/74

[52] U.S. Cl. .................................. 426/2; 426/656;
426/807
[51] Int. Cl.$^2$ .......................................... A23K 1/16
[58] Field of Search ............... 426/2, 69, 630, 635,
426/656, 807, 634, 636; 260/482 P, 471 R,
534 L

[56] References Cited

UNITED STATES PATENTS

| | | | |
|---|---|---|---|
| 3,015,567 | 1/1962 | Hause et al. ............................ | 426/2 |
| 3,256,095 | 6/1966 | Crosby et al. ........................ | 426/2 |

OTHER PUBLICATIONS

Richter, G. H., "Textbook of Organic Chemistry," John Wiley & Sons, Inc., 1948, p. 619.

*Primary Examiner*—A. Louis Monacell
*Assistant Examiner*—R. A. Yoncoskie
*Attorney, Agent, or Firm*—Bacon & Thomas

[57] ABSTRACT

A feed supplement for ruminant animals is provided comprising a lower alkyl ester of a biologically — useful amino acid other than methionine or a salt thereof, or a lower alkyl ester of a biologically — useful ester of a hydroxy analogue of a biologically — useful amino acid other than methionine or a salt thereof.

15 Claims, 2 Drawing Figures

AMINO ACID SUPPLEMENTS

This invention relates to improvements in the nutrition of ruminant animals such as cattle, sheep and goats and in particular concerns the use of esters of L-amino acids as feed supplements to increase the supply of particular amino acids available for the synthesis of body proteins, other metabolic processes involving amino acids, and for the promotion of medicinal effects.

Body proteins are made up of the residues of some twenty different kinds of amino acids of which half may be synthesized within the body but the other half must be absorbed, preformed, from the gastro-intestinal tract. These are the so-called essential amino acids which must be supplied in optimum proportions for efficient synthesis of body proteins. If any essential amino acid is lacking, protein synthesis cannot occur. The essential amino acids are L-arginine, L-histidine, L-isoleucine, L-leucine, L-methionine, L-phenylalanine, L-threonine, L-tryptophan and L-valine. The non-essential or dispensable amino acids are L-alanine, L-aspartic acid, L-asparagine, L-cystine, L-glutamic acid, L-glutamine, L-glycine, L-hydroxyproline, L-proline, L-serine and L-tyrosine.

Much of the dietary protein of ruminants is anaerobically fermented by bacteria in the rumen and reticulum where some of the constituent amino acids are taken up directly by bacteria and protozoa. A proportion of the amino acids is deaminated and the ammonia produced utilized by the bacteria to synthesize acids which are used for bacterial growth. Consequently the concentration of free amino acids in the rumen resulting from the proteolysis of dietary protein is very low and does not contribute materially to the supply of amino acids absorbed into the bloodstream. The ruminant obtains its requirements of essential amino acids largely from the digestion of protein in the abomasum and small intestine. This protein comprises dietary protein which has escaped fermentation in the rumen and microbial protein synthesized in the rumen.

Because a significant proportion of the ruminant's amino acid requirements comes from the digestion of microbial protein which has a relatively constant amino acid composition, the ruminant is less dependent than monogastric species on having dietary protein with the optimum proportions of amino acids. But since the proportions of essential amino acids absorbed are relatively constant in the ruminant, these proportions cannot be optimum for all forms of ruminant production in which the synthesis of particular proteins is emphasized. Thus, in the case of sheep selected for high rates of wool growth there is insufficient of the amino acid, cystine, or its precursor, methionine, absorbed to permit the rapid synthesis of cystine-rich wool proteins. Thus, cystine and methionine are what may be called limiting amino acids for wool growth. In principle once sufficient additional limiting amino acid has been supplied, another essential amino acid becomes limiting so that situations may be envisaged in which an additional supply of any one of the essential amino acids is beneficial for some form of ruminant production whether it be wool growth, body growth, or milk production. Other situations are know in which the excess of a particular amino acid may have adverse effects on the animal (Harper, A. E., Benevenga, N. J. and Wohlhueter, R. M., 1970 Physiological Reviews 50: 428–558). In such cases the toxicity may be often overcome by the additional supply of other amino acids including the dispensable amino acids.

Most attempts to provide amino acids to ruminants have involved protecting them from microbial fermentation in the rumen and reticulum, thereby, allowing them to pass through to the abomasum and small intestine where they can be absorbed. However, Australian Patent Application No. 66668/74 proposes for methionine a novel solution to this problem which involves supplying methionine or its hydroxy analogue, 2-hydroxy-4-methyl-thiobutyric acid, in the form of a lower alkyl ester. Such esters are rapidly absorbed from the rumen before significant breakdown by the bacteria and protozoa in the rumen has occurred. The present invention extends this principle to other amino acids particularly the other essential nutritional amino acids and amino acids which stimulate particular biological processes other than protein synthesis.

The amino acids which stimulate biological processes other than protein synthesis include the hormones, L-thyroxine and L-triiodothyronine which control metabolic rate. These hormones are normally sythesized by the thyroid gland but under some circumstances the rate of synthesis may be deficient and administration of additional hormone becomes desirable. The amino acid L-mimosine, L,$\alpha$-amino-3-hydroxy-4-oxo-1(4H)-pyridine propionic acid, which is present in the lugume tree Leucaena Leucocephala is known to cause a shedding of the fleece (Hegarty, Schinckel and Court (1964), Australian Journal of Agricultural Research 15: 153), although mimosine is largely metabolized to the inactive metabolite 3, 4-dihydroxy pyridine in the rumen. The present invention may be used to promote the absorption of mimosine before it is degraded in the rumen and so enhance the defleecing action and provide a method of chemical defleecing. It is also envisaged that the absorption of other amino acids with anthelmintic, antibiotic, insecticidal or other medicinal properties may be similarly enhanced in accordance with the present invention.

In general, this invention provides a means of promoting the absorption from the rumen of biologically useful amino acids (other than methionine) or hydroxy analogues of such biologically-useful amino acids.

In one aspect, this invention provides a feed supplement for ruminant animals which comprises a lower alkyl ester of a biologically-useful amino acid other than methionine or a salt thereof, or a lower alkyl ester of a hydroxy analogue of a biologically-useful amino acid other than methionine or a salt thereof.

In another aspect, this invention provides a method for supplying biologically-useful amino acids to a ruminant animal which comprises orally administering to said animal a feed supplement which comprises a lower alkyl ester of a biologically-useful amino acid other than methionine or a salt thereof, or a lower alkyl ester of a hydroxy analogue of a biologically-useful amino acid other than methionine or a salt thereof.

As previously described, the lower alkyl esters of biologically-useful amino acids or their precursors are rapidly absorbed from the rumen of the animal before significant breakdown by the bacteria and protozoa in the rumen has occurred. The esters are rapidly hydrolysed in the blood so that the effectiveness of the invention with respect to any particular amino acid can be monitored simply by determining the blood concentration of such amino acid, at different times after oral administration to the ruminant animal.

The feed supplements of the present invention may be administered to the ruminant animals in admixture with other ruminant feed materials such as lucerne or oats or feed materials which have been chemically modified to protect them from breakdown in the rumen such as by the treatment disclosed in Australian Patent Specification No. 402,712. Where the supplements are to be administered to grazing animals, they may be conveniently formulated into a salt lick, the concentration of supplement in the lick being adjusted so that the average consumption of the supplement is at a desired level. It is well know that salt consumption varies on different pastures, depending on the salt intake from the pasture and from the water supply. Thus, in situations where the salt intake from the pasture and the water supply is sufficiently high, the animals may not consume a salt lick. In such circumstances, they may be induced to consume the lick by the addition of attractive substances such as molasses or grain. In special circumstances, the feed supplement of this invention may also be administered in a supplementary feed composition, in a molasses lick, through the water supply or by means of a slow release device retained in the rumen of each animal. In using any of the above means, the concentration of feed supplement is adjusted so that the average consumption is at a desired level.

The rates at which the feed supplements of the present invention are administered will depend on the particular circumstances necessitating their use. By way of example, for sheep and goats the dosage will generally be between 0.5 and 5 g per day for supplements comprising esters of the essential amino acids, while the dosage for cattle will be five to ten times this amount. For feed supplements comprising thyroxine esters, a dosage rate for sheep and goats of 0.5 to 1 milligram of thyroxine equivalent per day is envisaged with five to ten times this dosage for cattle. Similarly, for feed supplements comprising mimosine esters for use in the chemical defleecing of sheep, the defleecing dose is expected to be in the range of 2 to 5 g of mimosine equivalent per day.

The feed supplement according to the present invention may comprise more than one lower alkyl ester of a biologically - useful amino acid other than methionine or lower alkyl ester of a hydroxy analogue of a biologically - useful amino acid other than methionine. Furthermore, particularly in the case of a feed supplement for administration to sheep, the supplement may also comprise a lower alkyl ester of methionine or its hydroxy analogue, 2-hydroxy-4-methyl thiobutyric acid.

Further features of the present invention will be apparent from the following examples which are included by way of illustration.

EXAMPLE 1.

FIG. 1. illustrates the plasma amino acid concentration responses to the intra-ruminal administration of the methyl esters of L-leucine (0—0), L-threonine (□ — □), L-valine (X—X), L-phenylalanine (Δ—Δ) and L-lysine ( o — o) in a dose of 5g. amino acid equivalent.

FIG. 1(a) shows that the plasma concentrations L-leucine, L-threonine, L-valine and L-lysine are increased severalfold within four hours of administration of the methyl esters into the rumen.

FIG. 1(b) shows that administration of equivalent amounts of the corresponding free acids into the rumen is without significant effect. The administration of the methyl ester of L-phenylalanine into the rumen did not raise the plasma concentration indicating that the hydrophobic side chain of this amino acid may prevent absorption through the rumen. However, even in cases where the absorption of an amino acid from the rumen is not facilitated by ester formation, the derivative may still be relatively resistant to microbial degradation in the rumen and be capable of absorption from the small intestine.

The amino acid esters were prepared by the method of Brenner, M. and Huber, W. (Helvetica Chimica Acta 36: 1109 (1953)).

The alcohol is chilled by the addition of solid carbon dioxide (dry ice), the appropriate amount of thionyl chloride added slowly so as to keep the temperature below −5° C and finally the amino acid is stirred into the mixture. The temperature is allowed to rise to ambient temperature and the mixture is distilled slowly to remove most of the alcohol. The remainder is removed at reduced pressure by rotary evaporation.

By redissolving the residue in a minimum amount of the alcohol and adding 4 to 5 volumes of ether followed by stirring and chilling to 0° C the solid hydrochloride is obtained.

EXAMPLE 2

Figure 2:
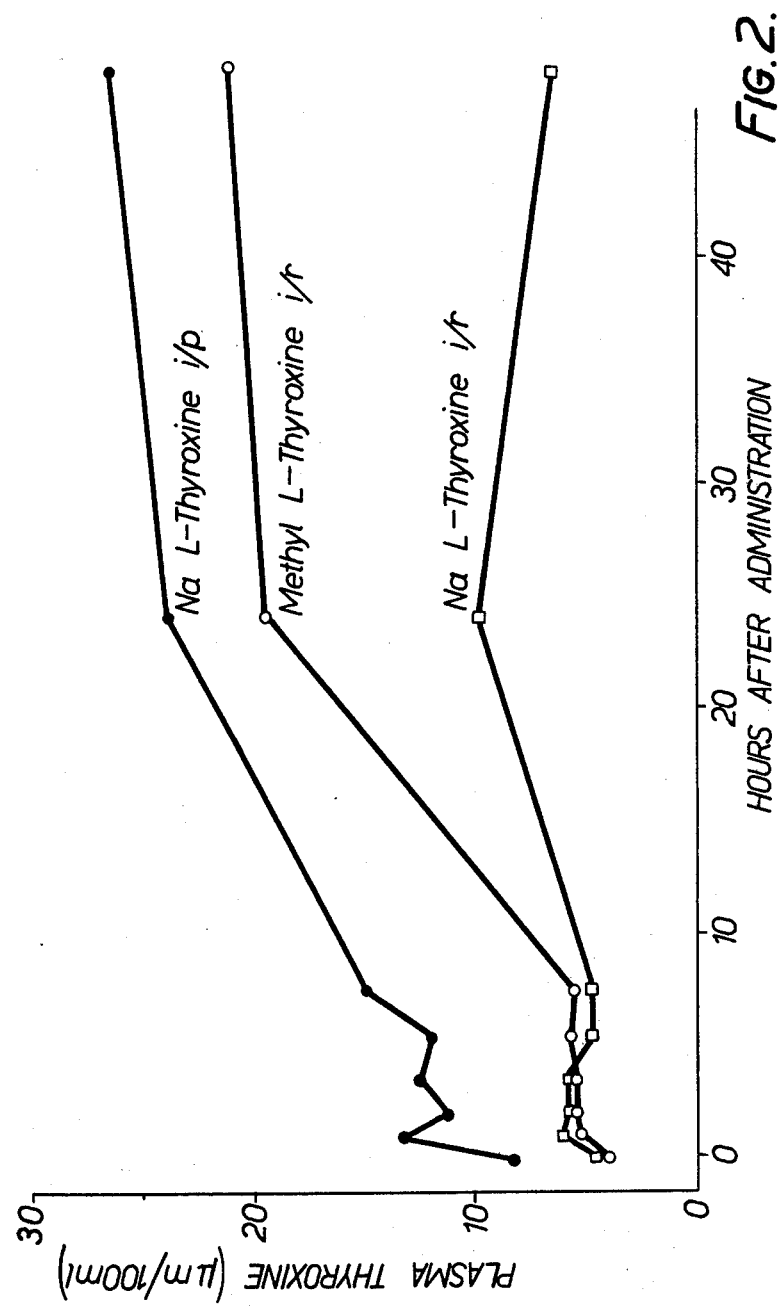

FIG. 2 illustrates the plasma L-thyroxine concentration responses to the intra-ruminal administration of Na L-thyroxine and methyl L-thyroxine in a dose of 25 mg thyroxine equivalent in comparison with the intraperitoneal administration of Na L-thyroxine in the same dose. This figure shows that the principle embodied in this invention extends to non-nutritional amino acids of biological importance. The intra-ruminal administration of the methyl ester of L-thyroxine is almost as effective as the intraperitoneal administration of thyroxine itself in raising the plasma concentration of thyroxine while the intraruminal administration of thyroxine itself is ineffective. The plasma concentration of thyroxine remains elevated because of the long half-life of this compound in the circulation.

EXAMPLE 3

It is well known that the first limiting amino acid for wool growth is L-cystine or its precursor DL-methionine because of the high concentration of cystine in the proteins which constitute wool keratin. Table 1 gives the results of an experiment indicating that L-lysine may be the second limiting amino acid for wool growth after methionine. The experiment also indicates that the addition of non-limiting essential amino acids may reduce the biological response. For any particular diet the order of the limiting amino acids may have to be experimentally determined since it will not be possible to derive this information from the analysis of feed composition alone.

Two methods were used for the preparation of methyl 2-hydroxy-4-methylthiobutyric acid ester:

i. Dry hydrochloric acid gas was bubbled to saturation into methanol, the calcium salt of 2-hydroxy-4-methylthiobutyric acid was added and the reaction mixture refluxed for 1 to 1½ hours. On cooling, the mixture was poured into one volume of ice-cold saturated sodium carbonate solution and extracted repeatedly with ether. Ether and water were removed from the extract by distillation and finally the methyl ester was distilled at reduced pressure (17 mm mercury b.p. 140°–150°).

ii. The calcium salt of 2-hydroxy-4-methylthiobutyric acid was dissolved at 50° C in 7.2 N hydrochloric acid and the solution transferred to a continuous downward displacement liquid-liquid extraction apparatus. The free 2-hydroxy-4-methylthiobutyric acid was extracted from the aqueous solution with a chloroform methanol: ION hydrochloric acid mixture (25:20:1 v/v) which was distilled from the reaction flask. Esterification took place in the reaction flask as the distillation proceeded. After 18 hours the organic solvents and then the ester were distilled from the flask at reduced pressure as above.

EXAMPLE 4

It may be expected that a diet comprising large quantities of maize protein protected from microbial fermentation in the rumen by formaldehyde treatment (Australian Patent Specification No. 402,712) will be limiting for wool growth in the essential amino acids L-tryptophan and L-lysine before other essential amino acids. Accordingly, such a diet was used to demonstrate the usefulness of lower alkyl esters of L-tryptophan and L-lysine in stimulating wool growth as an illustration that the lower alkyl esters of essential amino acids other than methionine may have a primary supplemental value in addition to a value in supporting the supplemental value of methionine.

Table 2 shows that the methyl, ethyl, and isopropyl esters of L-tryptophan ad L-lysine were all effective in stimulating wool growth of sheep fed a diet rich in formalintreated maize gluten. The experiment shows that the methyl, ethyl and isopropyl esters are all effective in supplying increased amounts of tryptophan and lysine.

Although wool growth has been used to demonstrate the effectiveness of supplying increased amounts of limiting amino acids in forms which are capable of absorption from the rumen and protected from degradation by rumen microflora, such supplements are equally useful in stimulating other forms of ruminant production such as meat production or milk production when the amino acid supply is limiting. Furthermore, such supplements in appropriate circumstances can be used to increase the efficiency of feed utilization for maintenance and increase the growth rate of young ruminants.

It is well known that the α-hydroxy analogues of the amino acids can replace the parent amino acids in the diet. Thus the present invention extends to the lower alkyl esters of the α-hydroxy analogues of the amino acids. An example of the effectiveness of such derivatives is shown in Example 3 above where a wool growth response to the methyl ester of the α-hydroxy analogue of methionine is demonstrated.

TABLE 1:

Wool Growth Response to the Addition of Esters of Amino Acids to the Diet*

| ESTER SUPPLEMENT DURING EXPERIMENTAL PERIOD | NO. OF SHEEP | WOOL GROWTH (clean dry)*** g per sheep per day | | % increase |
|---|---|---|---|---|
| | | PRE-EXPERIMENTAL (2 weeks) | EXPERIMENTAL (2 weeks)**** | |
| Nil | 6 | 8.88 | 8.79 | −1.0 |
| 2.2 g per day methyl ester of MHA** | 6 | 8.11 | 8.96 | 10.5 |
| 2.2 g per day methyl ester of MHA** + 1.6 g per day ethyl ester of serine HCL | 7 | 9.99 | 10.93 | 10.3 |
| 2.2 g per day methyl ester of MHA** + 1.67 g per day ethyl ester of L-Lysine HCL | 7 | 7.78 | 8.99 | 15.5 |
| 2.2 g per day methyl ester of MHA** + 1.54 g per day ethyl ester of L-Threonine HCL | 7 | 8.90 | 9.30 | 4.5 |
| 2.2 g per day methyl ester of MHA** + 1.61 g per day ethyl ester of L-Serine + 1.69 g per day ethyl ester of L-Lysine + 1.54 g per day ethyl ester of L-Threonine | 7 | 7.86 | 8.29 | 5.5 |

*700 g per day lucerne/oats (60:40)
**Methionine hydroxy analogue or 2-hydroxy/methyl-thiobutyric acid.
***Measured from 10 × 10 cm mid-side sample patches
****2 to 4 weeks after commencement of supplements.

TABLE 2:

Wool Growth Response to the Addition of Methyl, Ethyl and Isopropyl Esters of L-Lysine and L-Tryptophan to the Diet.

| NO. OF SHEEP | PRE-EXPERIMENTAL PERIOD (4 weeks) | | EXPERIMENTAL PERIOD (4 weeks) | | |
|---|---|---|---|---|---|
| | DIET | WOOL (clean dry) g per sheep per day | DIET | WOOL (clean dry) g per sheep per day | WOOL % INCREASE |
| 6 | 600 g per day formalin treated lucerne/casein (3:1) pellets | 9.81 | 600 g per day formalin treated lucerne/casein (3:1) pellets | 10.57 | 7.7 |
| 6 | 600 g per day formalin treated lucerne/casein (3:1) pellets | 10.03 | 600 g per day formalin treated lucerne/maize gluten (3:1) pellets | 10.71 | 6.8 |
| 7 | 600 g per day formalin treated lucerne/casein (3:1) pellets | 9.97 | lucerne/maize gluten diet + 8.0 g methyl lysine Hcl ester + 1.25 g methyl tryptophan Hcl ester | 11.86 | 19.0 |
| 8 | 600 g per day formalin treated lucerne/casein (3:1) pellets | 10.01 | lucerne/maize gluten diet + 8.45 g ethyl lysine Hcl ester + 1.32 g ethyl tryptophan Hcl ester | 11.05 | 10.4 |
| 7 | 600 g per day formalin treated lucerne/casein (3:1) pellets | 10.69 | lucerne/maize gluten diet + 8.9 g isopropyl lysine Hcl ester + 1.38 g isopropyl tryptophan Hcl ester | 12.27 | 14.8 |

The claims defining the invention are as follows:

1. A feed or lick composition for ruminant animals comprising a ruminant feed, supplementary feed or lick material and a lower alkyl ester of a biologically-useful amino acid other than a methionine, or a salt thereof, or a lower alkyl ester of a hydroxy analogue of a biologically-useful amino acid other than methionine, or a salt thereof.

2. A feed or lick composition according to claim 1, wherein the biologically-useful amino acid is selected from the group consisting of L-arginine, L-histidine, L-isoleucine, L-leucine, L-phenylalanine, L-threonine, L-tyrptophan and L-valine.

3. A feed or lick composition according to claim 1, wherein the biologically-useful amino acid is selected from the group consisting of L-alanine, L-aspartic acid, L-asparagine, L-cystine, L-glutamic acid, L-glutamine, L-glycine, L-hydroxyproline, L-proline, L-serine and L-tyrosine.

4. A feed or lick composition according to claim 1, wherein the biologically-useful amino acid is L-thyroxine or L-triiodo thyronine.

5. A feed or lick composition according to claim 1, wherein the biologically-useful amino acid is L-mimosine.

6. A feed or lick composition according to claim 1, further comprising a lower alkyl ester of methionine of its hydroxy analogue, 2-hydroxy-4-methyl thiobutyric acid.

7. A method for supplying biologically-useful amino acids to a ruminant animal which comprises orally administering to said animal a feed supplement comprising a lower alkyl ester of a biologically-useful amino acid other than methionine, or a salt thereof, or a lower alkyl ester of a hydroxy analogue of a biologically-useful amino acid other than methionine, or a salt thereof.

8. A method according to claim 7, wherein the biologically-useful amino acid is selected from the group consisting of L-arginine, L-histidine, L-isoleucine, L-leucine, L-phenylalanine, L-threonine, L-tyrptophan and L-valine.

9. A method according to claim 7, wherein the biologically-useful amino acid is selected from the group consisting of L-alanine, L-aspartic acid, L-asparagine, L-cystine, L-glutamic acid, L-glutamine, L-glycine, L-hydroxyproline, L-proline, L-serine and L-tyrosine.

10. A method according to claim 7 wherein the biologically-useful amino acid is L-thyroxine or L-triiodo thyronine.

11. A method according to claim 7, wherein the biologically-useful amino acid is L-mimosine.

12. A method according to claim 7, wherein said feed supplement further comprises a lower alkyl ester of methionine or its hydroxy analogue, 2-hydroxy-4-methyl thiobutyric acid.

13. A method according to claim 7, wherein said feed supplement is administered in the form of a feed, supplementary feed or lick composition.

14. A method according to claim 7, wherein said feed supplement is administered in the water supply.

15. A method according to claim 7, wherein said feed supplement is administered in a slow release device to be retained within the rumen of the animal.

* * * * *